US008186689B2

(12) United States Patent
Miyazawa et al.

(10) Patent No.: US 8,186,689 B2
(45) Date of Patent: May 29, 2012

(54) SEALING DEVICE FOR GEAR CHAMBER

(75) Inventors: Masamichi Miyazawa, Anjo (JP);
Masayoshi Hiraiwa, Anjo (JP)

(73) Assignee: Makita Corporation, Anjo (JP)

( * ) Notice: Subject to any disclaimer, the term of this patent is extended or adjusted under 35 U.S.C. 154(b) by 303 days.

(21) Appl. No.: 12/588,612

(22) Filed: Oct. 21, 2009

(65) Prior Publication Data
US 2010/0102515 A1  Apr. 29, 2010

(30) Foreign Application Priority Data

Oct. 24, 2008  (JP) ................................. 2008-274340

(51) Int. Cl.
*F16J 15/40* (2006.01)

(52) U.S. Cl. ........................................ 277/423; 277/428

(58) Field of Classification Search .......... 277/423–425, 277/428, 429
See application file for complete search history.

(56) References Cited

U.S. PATENT DOCUMENTS

| 2,005,526 | A | * | 6/1935 | Albeck | 277/356 |
| 2,688,502 | A | * | 9/1954 | Cobb | 277/376 |
| 3,292,847 | A | * | 12/1966 | Herrick | 418/95 |
| 5,035,155 | A | * | 7/1991 | Robledo | 74/467 |
| 5,125,672 | A | * | 6/1992 | Wycliffe | 277/351 |
| 5,478,048 | A | * | 12/1995 | Salesky et al. | 251/214 |
| 6,000,140 | A | | 12/1999 | Nickels, Jr. et al. | |
| 6,145,205 | A | | 11/2000 | Nickels, Jr. et al. | |
| 6,550,350 | B2 | * | 4/2003 | Martin | 74/18.2 |
| 7,296,801 | B2 | * | 11/2007 | Chen | 277/429 |
| 8,020,874 | B2 | * | 9/2011 | Kometani et al. | 277/348 |
| 2002/0130470 | A1 | * | 9/2002 | Machida | 277/423 |
| 2003/0178783 | A1 | * | 9/2003 | Langston et al. | 277/423 |
| 2008/0196523 | A1 | * | 8/2008 | Liu | 74/89.4 |

FOREIGN PATENT DOCUMENTS

| DE | 3211715 A1 | 10/1983 |
| DE | 19855879 A1 | 6/1999 |
| JP | U-62-32783 | 2/1987 |
| JP | U-5-45293 | 6/1993 |
| JP | A-11-245179 | 9/1999 |

OTHER PUBLICATIONS

Office Action issued in European Application No. 09 013 417.2 dated Jun. 7, 2011.

* cited by examiner

*Primary Examiner* — Vishal Patel
(74) *Attorney, Agent, or Firm* — Oliff & Berridge, PLC

(57) ABSTRACT

In a gear chamber 10, a sealing member 21 is attached to a rotary shaft 12 of an electric motor 11, and a grease return part 21a is provided on this sealing member 21. Thus, grease raked by a helical gear 12a is blown off diagonally forward with respect to a radial direction as a result of a centrifugal force, and it is possible to prevent the grease from leaking out of a ball bearing 20.

14 Claims, 2 Drawing Sheets

FRONT ⟵⟶ REAR

FRONT ⟵⟶ REAR

This application claims priority to Japanese patent application serial number 2008-274340, the contents of which are incorporated herein by reference.

SEALING DEVICE FOR GEAR CHAMBER

BACKGROUND OF THE INVENTION

1. Field of the Invention

The present invention relates to a sealing device for a gear chamber of a power tool such as an electric screwdriver, which gear chamber accommodates a gear train that can reduce a rotational speed of an electric motor and output a rotative power.

2. Description of the Related Art

Inside a main body of this kind of power tools, a gear chamber is defined for accommodating a reduction gear train that can reduce a rotational speed of an electric motor as a driving source and output a rotative power. Grease (lubricating oil) is sealingly contained in the gear chamber to lubricate the gear train accommodated in this gear chamber. In the gear chamber, for example, an output shaft of the electric motor as an input side component and a spindle as an output side component are rotatably supported respectively, and the reduction gear train is located between them. Support sections for the spindle and the output shaft of separating walls defining the gear chamber include bearings for rotatably supporting these parts, and in addition to this, sealing members are attached for preventing grease from leaking out of the bearings.

Known technologies relating to a gear chamber and a sealing structure for sealing the gear chamber are disclosed in Japanese Laid-Open Patent Publication No. 11-245179 and Japanese Laid-Open Utility Model Publication Nos. 5-45293 and 62-32783. Japanese Laid-Open Patent Publication No. 11-245179 describes a technology to provide a means for compulsively circulating and scattering grease contained in at least one of an input shaft and an output shaft each protruding into the gear chamber. Japanese Laid-Open Utility Model Publication No. 5-45293 describes a technology to efficiently lubricate by a little amount of grease by providing a rib or a concave part in a part of a gear of a gear train to splash the grease upward as a result of centrifugal force. Further, Japanese Laid-Open Utility Model Publication No. 62-32783 describes a technology to prevent grease from leaking out of bearings that rotatably support a motor shaft by attaching a helical coil on the motor shaft to cause rotation of the helical coil together with the motor shaft. The helical direction of the helical coil is opposite to the rotational direction of a pinion.

However, the technologies disclosed in Japanese Laid-Open Patent Publication Nos. 11-245179 and Japanese Laid-Open Utility Model Publication No. 5-45293 are aimed to compulsively circulate the grease within the gear chamber and do not serve to prevent the grease from leaking. According to the technology to prevent the grease from leaking described in Japanese Laid-Open Utility Model Publication No. 62-32783, there has been a problem that a long input shaft is needed to cause increase in size of the power tool mainly in a lengthwise direction of the power tool, because of the attachment of the helical coil on the motor shaft (input shaft).

Therefore, there is a need in the art to provide a sealing device that can reliably prevent the grease from leaking out of the gear chamber in a compact and simple structure without increasing in size of the power tool.

SUMMARY OF THE INVENTION

One aspect according to the present invention includes a sealing device for sealing between a gear chamber and an electric motor. The gear chamber accommodates a reduction gear train and contains grease for lubricating the reduction gear train, and the reduction gear train reduces rotation of an electric motor. The sealing device further includes a separating wall separating the gear chamber from the electric motor and supporting a rotary shaft via a bearing. The rotation of the electric motor is transmitted to the reduction gear via the rotary shaft. The sealing device further includes a sealing member attached to the rotary shaft so as to be able to rotate together with the rotary shaft, and a grease return part provided on the sealing member on the side of the gear chamber so that the grease can be blown off in a direction away from the bearing as a result of a centrifugal force produced by the rotation of the rotary shaft.

Therefore, the sealing member rotating together with the output shaft causes the grease attached to the grease return part of the sealing member (the gear chamber side) to scatter toward the central side of the gear chamber (direction away from the bearing) as a result of a centrifugal force. Thus, the grease flowing toward the bearing and received by the grease return part is returned back to the central side of the gear chamber as a result of a centrifugal force. Therefore, the grease that will leak out of the bearings outside off the gear chamber can be reduced.

Hence, it is possible to reliably prevent the grease from leaking out of the gear chamber by a simple structure without accompanying increase in size of the tool grow in size in a lengthwise direction, because it is only necessary to attach an annular sealing member to the output shaft instead of a known helical coil.

The grease return part may have a concave surface having a mortar-like configuration. Simply providing the mortar shaped concave surface to the grease return part can prevent the grease from leaking out of the gear chamber.

DETAILED DESCRIPTION OF THE INVENTION

Each of the additional features and teachings disclosed above and below may be utilized separately or in conjunction with other features and teachings to provide improved sealing devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
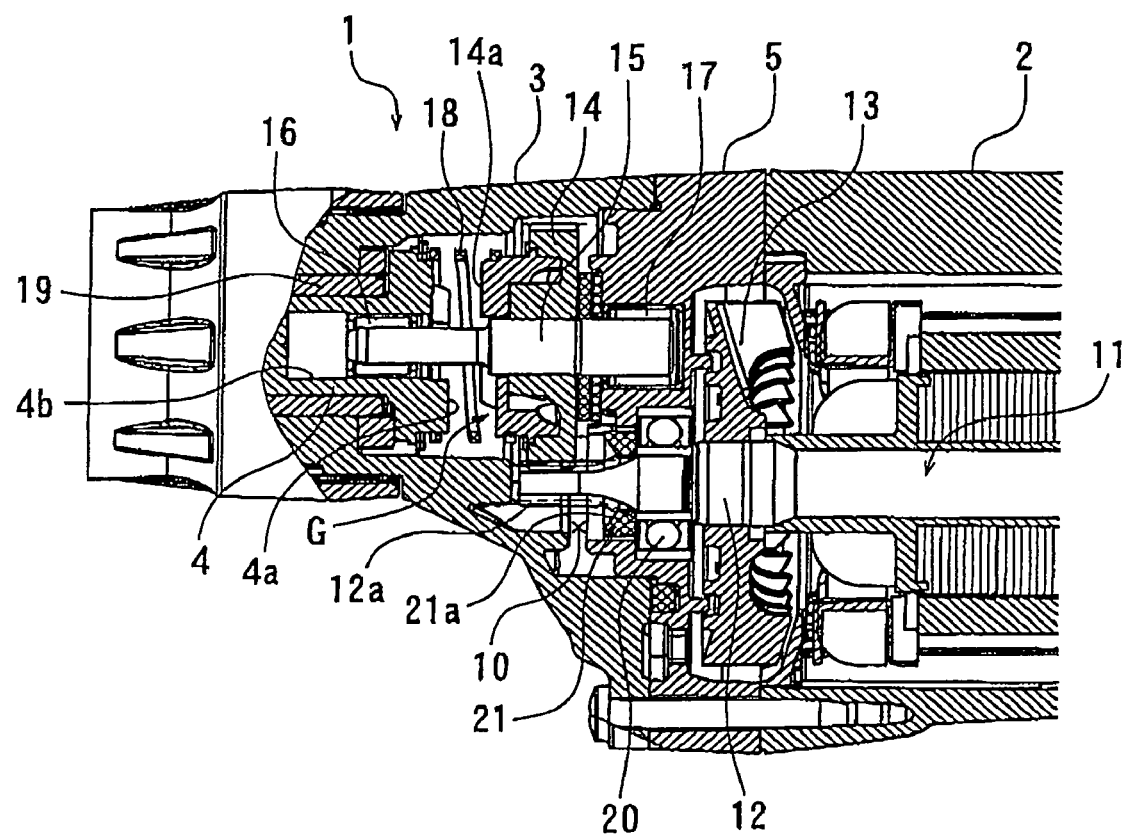
FIG. 1 is a side view showing the internal structure of a power tool incorporating a sealing device according to an embodiment of the present invention.

Next, an embodiment of the present invention will be described with reference to FIGS. 1 to 3. FIG. 1 mainly shows a region of a gear chamber 10 of a power tool 1. The present embodiment illustrates a so-called screwdriver as an example of the power tool 1. A separating wall 5 is clamped between a main body housing 2 and a front housing 3 of this power tool 1. A space defined between the separating wall 5 and the front housing 3 serves as a gear chamber 10.

In this gear chamber 10, a reduction gear train G is accommodated and outputs the rotative power of an electric motor 11 as a driving source after reduction in the rotational speed. An output shaft 12 of the electric motor 11 is rotatably supported by a ball bearing 20 mounted to the separating wall 5. The output shaft 12 passes through the separating wall 5. A pinion gear part 12a is formed on a leading end of the output shaft 12 at a position inside the separating wall 5 (on the side of the gear chamber 10). In this present embodiment, a helical gear is used as this pinion gear part 12a. A cooling fan 13 is mounted to this output shaft 12 at a position on an outer side of the separating wall 5.

The gear train G accommodated in the gear chamber 10 includes the aforementioned pinion gear part 12a and a drive gear 14 that engages with the pinion gear part 12a. A helical gear is used as this drive gear 14 to correspond to the pinion gear part 12a.

The drive gear 14 is mounted to a drive shaft 15. The drive shaft 15 is supported by front and rear bearings 16 and 17 so as to be rotatable about its axis. The front bearing 16 is fitted into a supporting hole 4b formed in the spindle 4. The rear bearing 17 is fitted into the separating wall 5.

The spindle 4 is rotatably supported by the front housing 3 via a bearing 19. Although not shown in the drawings, a leading end side of the spindle 4 extends into a front side of the front housing 3. A bit for tightening a screw is attached to the leading end of the spindle 4.

A compressed spring 18 is interposed between the drive gear 14 and the spindle 4. The spindle 4 is biased forward by this compressed spring 18. Clutch teeth 4a are provided on the rear surface of the spindle 4. Meanwhile, clutch teeth 14a are provided on the front surface of the drive gear 14. By setting a screw to the screw-tightening bit attached to the leading end of the spindle 4 and pressing the power tool 1 in the screw-tightening direction in a condition where the set screw is positioned at a position intended for tightening the screw, the clutch teeth 4a are engaged with the clutch teeth 14a on the side of the drive gear 14 as a result of the retracting movement of the spindle 4 against the compressed spring 18, so that the rotative power of the electric motor 11 is transmitted to the spindle 4.

Since the spindle 4 is pressed by the compressed spring 18, it moves forward (screw-tightening direction) as the screw proceeds in the tightening direction. When the spindle 4 has moved forward with a fixed stroke and the screw has been tightened completely, the clutch teeth 4a are disengaged from the clutch teeth 14a and the transfer of the rotative power to the spindle 4 stops, which causes the drive gear 14 to run idle. After that, when the pressing operation of the power tool 1 is released, the spindle 4 is moved forward and returned to the end position by the compressed spring 18. Further, when the electric motor 11 stops, the drive gear 13 also stops. Detailed explanations about the engaging clutch mechanism are omitted since this mechanism is well known.

The compressed spring 18 and a rear part of the spindle 4 as well as the gear train G are accommodated within the gear chamber 10. Inside this gear chamber 10, grease is sealingly contained to primarily lubricate the gear train G. As described above, a helical gear is used as the pinion gear part 12a. For this reason, depending on factors including a rotational direction of the pinion gear part 12a, a helical angle and a helical direction of the pinion gear part or the helical gear 12a, etc., the contained grease is apt to be raked toward the side of the bearing 20 by the pinion gear part 12a. Since the ball bearing 20 is constructed such that the steel balls are located between an inner race and an outer race, there is a narrow clearance between the inner race and the outer race. Thus, there is a possibility that grease raked by the pinion gear part 12a is leaked out of the gear chamber 10 through this narrow clearance.

According to this embodiment, a sealing member 21 is attached to the ball bearing 20 on an inner side of the gear chamber 10 in order to prevent the grease from leaking through this ball bearing 20. This sealing member 21 has a substantially annular shape and is fixedly attached to the output shaft 12, so that the sealing member 21 rotates together with the output shaft 12. As shown in FIG. 1, the sealing member 21 always blocks the front side of the ball bearing 12 (the side of the gear chamber 10). The blocking by this sealing member 21 prevents the grease inside the gear chamber 10 from leaking outward through the ball bearing 12.

In addition, a grease return part 21a is provided on the front surface of the sealing member 21 in order to more reliably prevent the grease inside the gear chamber 10 from leaking outward through the ball bearing 12. Thus, there is little grease leaked to the ball bearing 12.

Figure 2:
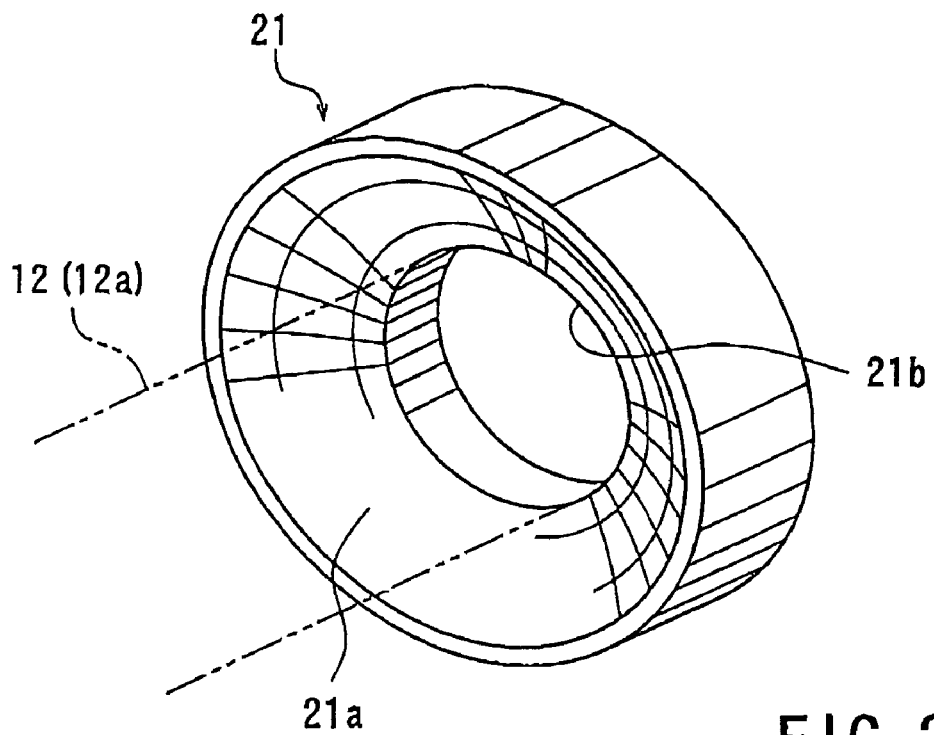
FIG. 2 is a perspective view of a sealing member of the sealing device.
Figure 3:
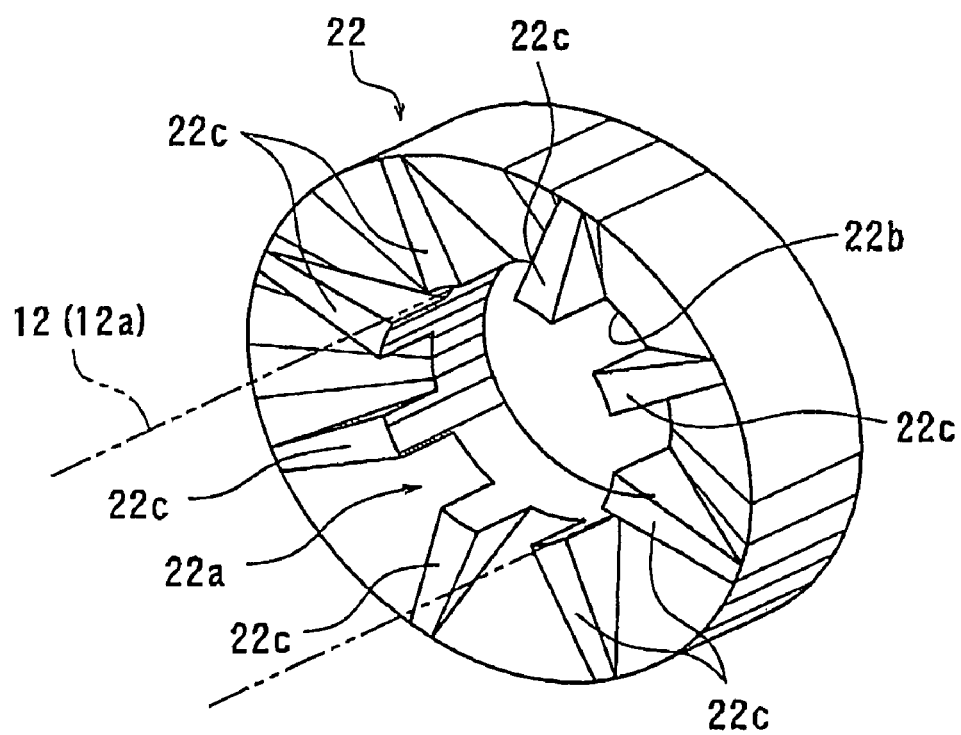
FIG. 3 is a perspective view of a sealing member according to another embodiment of the present invention.

FIG. 2 shows the sealing member 21 independently. The sealing member 21, for example, is made of resin; and press-fitted on the output shaft 12. However, it may be made of metal. In the present embodiment, the grease return part 21a is formed as a mortar-like concave part as shown in the FIG. 1. A supporting hole 21b through which the output shaft 12 of the electric motor 11 is inserted is formed in the center of the sealing member 21. The grease return part 21a is curved in such a direction that its depth becomes deeper toward this supporting hole 21b. When the electric motor 11 starts to run, this sealing member 21 rotates together with the output shaft 12. For this reason, a centrifugal force acts on the grease adhered to the grease return part 21a when the electric motor 11 starts to run and the sealing member 21 rotates. As the centrifugal force acts on the grease adhered to the grease return part 21a, the grease moves toward the outer circumference while whirling along and within the grease return part 21a, and eventually the grease is blown off forward.

In this way, the grease raked toward the ball bearing 20 is received in the grease return part 21a of the sealing member 21, and eventually the grease inside the gear chamber 10 is prevented from leaking outward (inside the main body housing 2) through the ball bearing 20. Further, since the grease is received in the grease return part 21a curved in a mortar-shaped way, it returns diagonally forward (in a direction away from the ball bearing 20 and toward the center of the gear chamber 10) as a result of the centrifugal force, not merely radially. For this reason, it is further ensured that the grease is prevented from leaking through the ball bearing 20.

According to the sealing device constructed as described above, helical gears are used as the pinion gear part 12a and the drive gear 14. Depending on the rotative direction of these helical gears, helical direction or helical angle of the helical gears, the grease contained inside the gear chamber 10 is apt to be raked toward the ball bearing 20 as a result of the raking force of the helical gears produced when the pinion gear 12a rotates. In view of this, according to this embodiment, the sealing member 21 is attached to the front side of the ball bearing 20 (inside the gear chamber 10). Since this sealing member 21 blocks the front side of the ball bearing 20, the grease is prevented from moving to the ball bearing 20.

Further, since the grease return part 21a of the sealing member 21 is curved in a mortar-shaped way, the grease raked toward the center of the sealing member 21 by the rotation of the pinion gear part 12a is blown off diagonally forward with respect to a radial direction as a result of the centrifugal force. Thus, it is possible to prevent the grease from being raked toward the bearing 20 and from leaking outward, and consequently, it is possible to improve the sealing of the gear chamber 10.

In addition, the above effect can be obtained with a simple and compact structure in which the annular sealing member 21 having an outer diameter smaller than an outer diameter of the ball bearing 20 is attached to the output shaft 12a.

Various modifications can be made to the embodiment explained above. For example, although an electric screwdriver is illustrated as an example of the power tool 1 in the above embodiment, the present invention can be applied to any other power tools or air tools having a gear chamber in which lubricating oil is contained.

Further, although, in the illustrated construction, a helical gear is used as the pinion gear part 12a to which the sealing member 21 is attached, the present invention can be applied in the same way to the construction in which a normal spur gear is used as the pinion gear part 12a.

Further, although the concave part curved in a mortar-shaped way is shown as the grease return part 21a, the grease return part 21 may have any other configurations than this configuration. For example, the curved concave part can be replaced with a tapered part. Further, as shown in FIG. 3, a structure having radial ribs 22c added to a taper concave part can be adopted. A grease return part 22a of a sealing member 22 shown in FIG. 3 is provided with a plurality of ribs 22c along the radial direction of the taper concave part. A supporting hole 22b through which the output shaft 12 is inserted is formed at the center of the sealing member 22.

By the grease return part 22a of this sealing member 22, a centrifugal force also acts on the grease received in the grease return part 22a that rotates together with the output shaft 12. For this reason, the grease raked by the pinion gear part 12a toward the central side of the grease return part 22a is returned to the central side of the gear chamber 10 as a result of the centrifugal force. In case of this grease return part 22a, the grease moved to the central side of the grease return part 22a is forced to be raked by each rib 22c and is blown off outward in a radial direction as a result of the centrifugal force, and eventually the sealing performance of the gear chamber 10 can be further improved.

In the above embodiments, ball bearings are illustrated as bearings for rotatably supporting the output shaft 12 of the electric motor 11. However, the illustrated sealing member 21(22) can be applied to the other type of bearings having an inner race and an outer race, such as roller bearings and taper-rolling bearings, in order to achieve the same effect.

Further, in the above embodiments, the structure is shown in which the output shaft 12 of the electric motor 11 directly extends into the gear chamber 10. However, the illustrated sealing member 21(22) can be applied to obtain the same effect in a structure in which t the speed of the electric motor is reduced outside the gear chamber 10 by another reduction gear mechanism having a reduction shaft to which a reduction gear is attached. The reduction shaft extends into the gear chamber 10, thereby the output shaft of the electric motor indirectly extends into the gear chamber 10, so that the speed of the electric motor is reduced by the reduction gear mechanism and is further reduced by the reduction gear train G.

The invention claims:

1. A power tool for use with grease, comprising:
    an electric motor;
    a gear chamber accommodating therein a reduction gear train and containing therein the grease for lubricating the reduction gear train, the reduction gear train reducing rotation of the electric motor, the rotation of the electric motor being transmitted to the reduction gear train via a rotary shaft; and
    a sealing device for preventing the grease from leaking out of the gear chamber, the sealing device including:
        a separating wall separating the gear chamber from the electric motor and supporting the rotary shaft via a bearing;
        a sealing member attached to the rotary shaft so as to be able to rotate together with the rotary shaft; and
        a grease return part provided on the sealing member on the side of the gear chamber;
    wherein the grease can be blown off in a direction away from the bearing as a result of the centrifugal force produced by the rotation of the rotary shaft.

2. The power tool according to claim 1, wherein the sealing member is in contact with the bearing.

3. The power tool according to claim 1, wherein the grease return part is formed integrally with the sealing member.

4. The power tool according to claim 1, wherein the grease return part has a concave surface concave toward the side of the bearing.

5. The power tool according to claim 4, wherein the concave surface has a diameter about an axis of rotation of the rotary shaft, the diameter of the concave surface increasing in a direction away from the bearing.

6. The power tool according to claim 1, wherein the sealing member has a supporting hole through which the rotary shaft is inserted.

7. The power tool according to claim 5, wherein the concave surface extends along a straight line as viewed in a cross section including the rotational axis of the rotary shaft.

8. The power tool according to claim 4, wherein the concave surface extends along a curved line as viewed in a cross section including the rotational axis of the rotary shaft.

9. The power tool according to claim 4, wherein the concave surface has a mortar-like shape.

10. The power tool according to claim 4, wherein the grease return part is provided with a plurality of ribs along the radial direction with respect to the rotation.

11. The power tool according to claim 1, wherein the bearing is a ball bearing.

12. The power tool according to claim 1, wherein the bearing is a roller bearing.

13. The power tool according to claim 1, wherein the rotary shaft is an output shaft of the electric motor.

14. The power tool according to claim 1, further comprising a reduction gear mechanism coupled to the electric motor and the rotary shaft is a gear shaft serving as an output shaft of the reduction gear mechanism.

* * * * *